(12) United States Patent  (10) Patent No.: US 6,625,374 B2
Holman et al.  (45) Date of Patent: Sep. 23, 2003

(54) CABLE STORAGE SPOOL

(75) Inventors: John C. Holman, Coon Rapids, MN (US); Trevor D. Smith, St. Louis Park, MN (US); Thomas C. Tinucci, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 112 days.

(21) Appl. No.: 09/801,573

(22) Filed: Mar. 7, 2001

(65) Prior Publication Data

US 2002/0126978 A1 Sep. 12, 2002

(51) Int. Cl.[7] .................................................. G02B 6/00
(52) U.S. Cl. ........................ 385/135; 385/134; 385/136
(58) Field of Search ................................. 385/134, 135, 385/136, 137

(56) References Cited

U.S. PATENT DOCUMENTS

| | | |
|---|---|---|
| 4,359,262 A | 11/1982 | Dolan |
| 4,585,303 A | 4/1986 | Pinsard et al. |
| 4,630,886 A | 12/1986 | Lauriello et al. |
| 4,687,289 A | 8/1987 | DeSanti |
| 4,702,551 A | 10/1987 | Coulombe |
| 4,717,231 A | 1/1988 | Dewez et al. |
| 4,722,585 A | 2/1988 | Boyer |
| 4,752,110 A | 6/1988 | Blanchet et al. |
| 4,765,708 A | 8/1988 | Becker et al. |
| 4,765,709 A | 8/1988 | Suillerot et al. |
| 4,792,203 A | 12/1988 | Nelson et al. |

(List continued on next page.)

FOREIGN PATENT DOCUMENTS

| | | |
|---|---|---|
| DE | 27 21 300 A1 | 11/1978 |
| DE | 44 05 665 A1 | 8/1995 |
| FR | 2579330 | 3/1985 |
| WO | WO 95/07480 | 3/1995 |
| WO | WO 96/10203 | 4/1996 |
| WO | WO 96/19745 | 6/1996 |
| WO | WO 00/17693 | 3/2000 |

OTHER PUBLICATIONS

ADC Telecommunications FL2000 Splice Panel Installation Instructions, 12 pages, Issue 5, Jan. 1998.
ADC Telecommunications FlexLight 2000™ System Planning and Application Guide, 1st Edition, Issue 1, Apr. 1994, 44 pages.
ADC Telecommunications brochure entitled "AGX 72 Fiber Outside Plant Panel," 4 pages, dated Jan. 1995.
ADC Telecommunications catalog entitled "FL2000 System Second Edition," dated Jan. 1995, 43 pages.
ADC Telecommunications catalogue entitled "Fiber Panel Products Second Edition," 117 pages, dated Jul. 1996.
ODF—system MAXI, Believed to correspond to WO 96/19745.

Primary Examiner—David V. Bruce
Assistant Examiner—Michael H Caley
(74) Attorney, Agent, or Firm—Merchant & Gould P.C.

(57) ABSTRACT

A cable storage assembly for storing an excess length of cable. The assembly includes a cable spool, spool holder, and holder mount. The cable spool has two flange members coupled by a center post, together forming an exposed cable storage chamber. A first flange member includes radius limiting elements and a transition opening. The spool receives a curved support arm of the spool holder into the cable storage chamber. The spool is removably retained on the spool holder by means of retaining grooves and retaining lips in the flanges and on the support arm. The center post of the spool may be characterized by two different radii of curvature. The spool holder is pivotally mounted in the holder mount. The holder mounts define a plurality of mounting locations which allow for a staggered stack of spools and spool holders. The spool holders and holder mounts may also include detent tabs and notches.

6 Claims, 10 Drawing Sheets

U.S. PATENT DOCUMENTS

| | | |
|---|---|---|
| 4,798,432 A | 1/1989 | Becker et al. |
| 4,818,054 A | 4/1989 | George et al. |
| 4,840,449 A | 6/1989 | Ghandeharizadeh |
| 4,995,688 A | 2/1991 | Anton et al. |
| 5,013,121 A | 5/1991 | Anton et al. |
| 5,066,149 A | 11/1991 | Wheeler et al. |
| 5,069,523 A | 12/1991 | Finzel et al. |
| 5,074,635 A | 12/1991 | Justice et al. |
| 5,093,885 A | 3/1992 | Anton |
| 5,115,489 A | 5/1992 | Norris |
| 5,131,066 A * | 7/1992 | Foss .......................... 385/135 |
| 5,208,894 A | 5/1993 | Johnson et al. |
| 5,247,603 A | 9/1993 | Vidacovich et al. |
| 5,249,252 A | 9/1993 | Noto |
| 5,363,466 A | 11/1994 | Milanowski et al. |
| RE34,955 E | 5/1995 | Anton et al. |
| 5,481,639 A | 1/1996 | Cobb et al. |
| 5,511,144 A | 4/1996 | Hawkins et al. |
| 5,515,472 A | 5/1996 | Mullaney et al. |
| 5,519,804 A | 5/1996 | Burek et al. |
| 5,661,841 A | 8/1997 | Van Noten |
| 5,717,811 A | 2/1998 | Macken |
| 5,802,237 A | 9/1998 | Pulido |
| 6,311,008 B1 * | 10/2001 | Foss .......................... 385/135 |
| 6,418,266 B1 * | 7/2002 | Vitantonio ................. 385/135 |

* cited by examiner

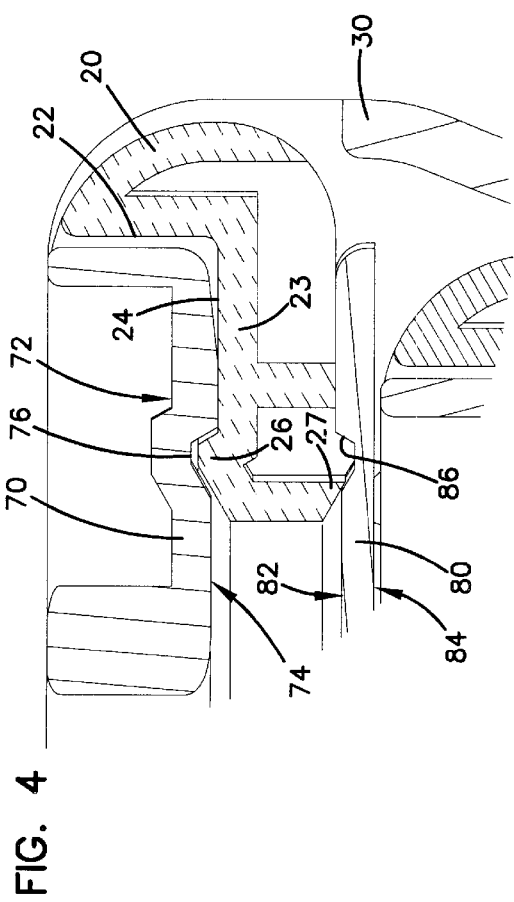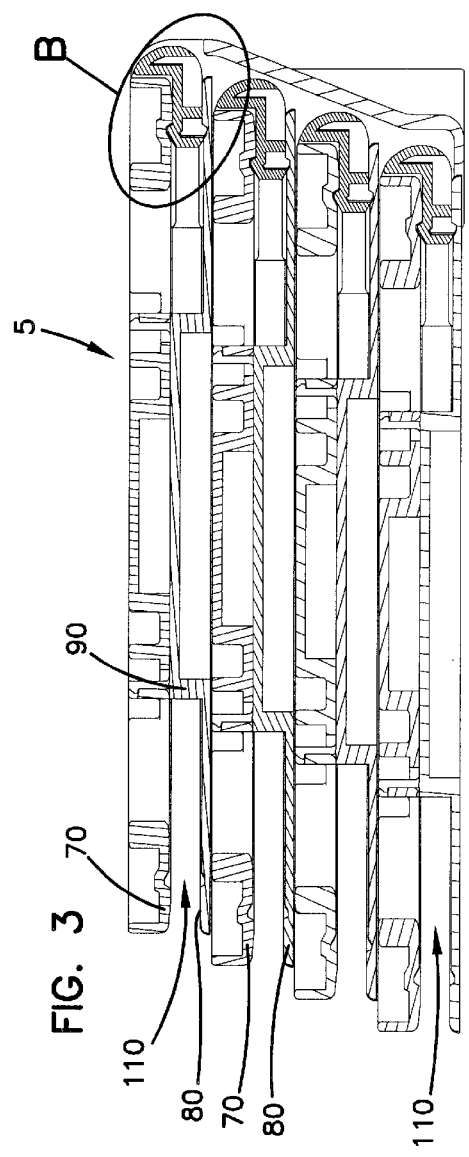

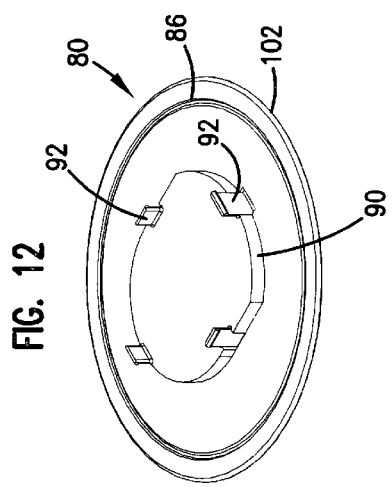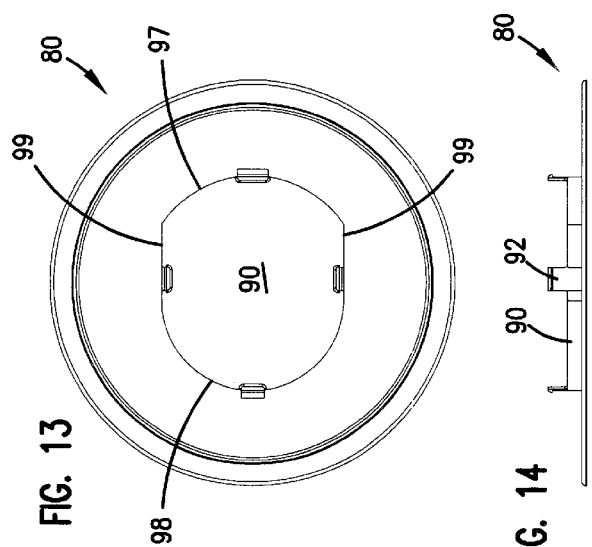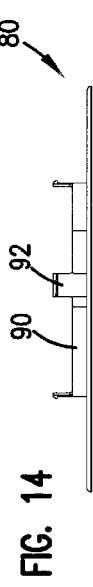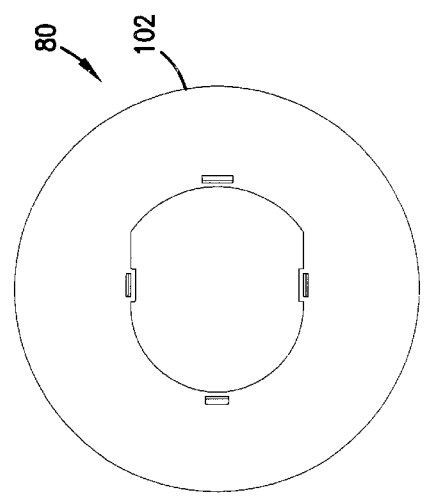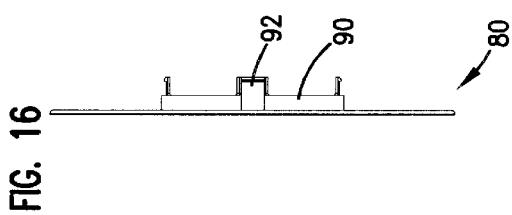

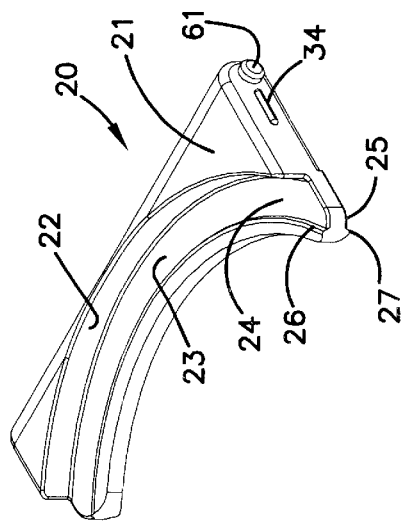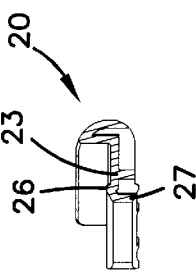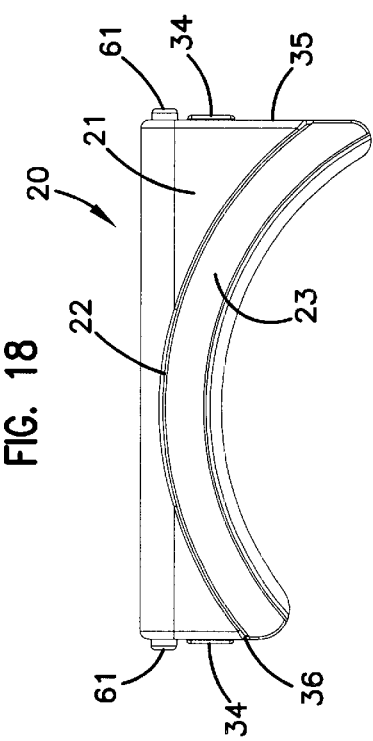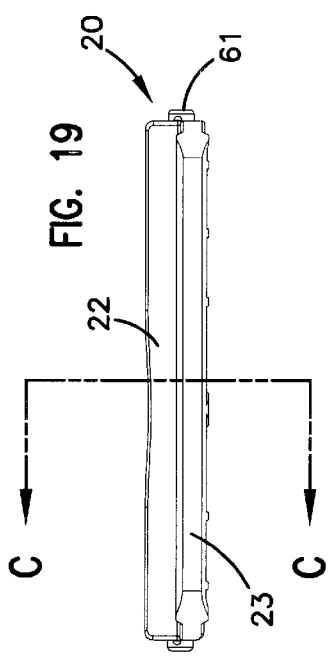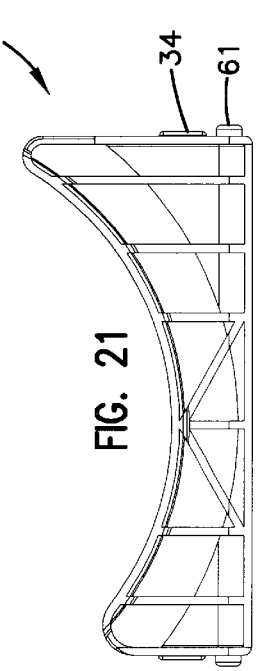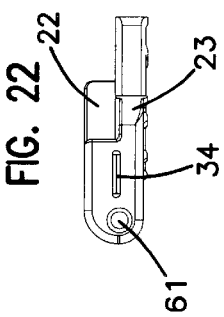

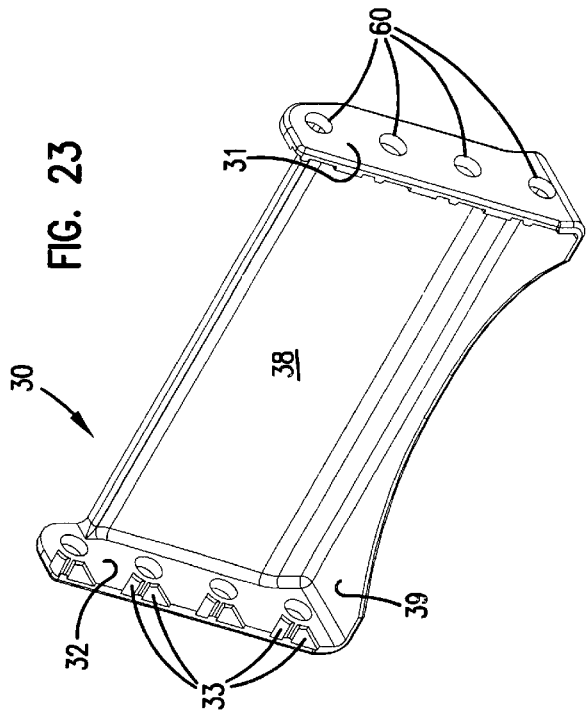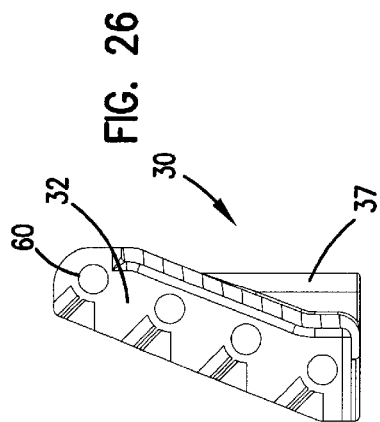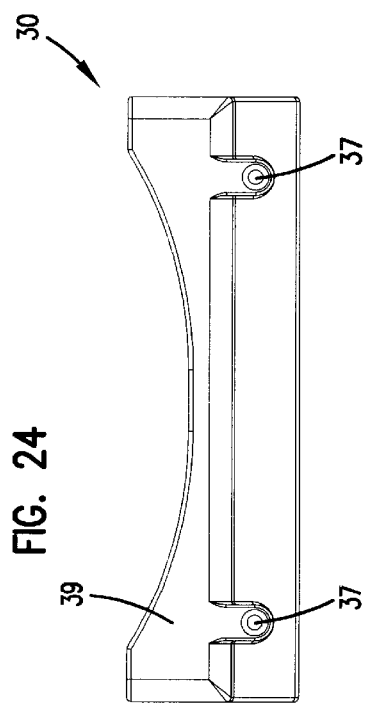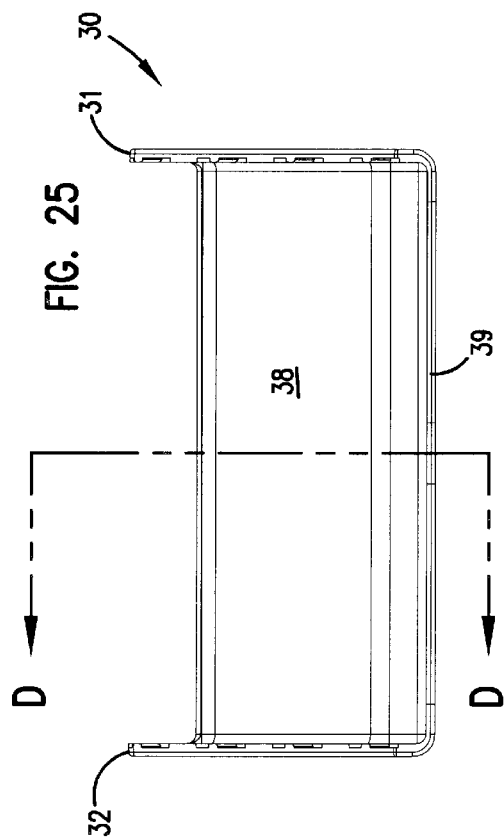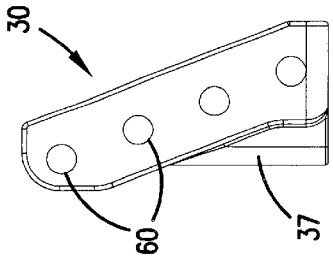

CABLE STORAGE SPOOL

This invention pertains to a communication system in which signals are carried through cables such as optical fibers. More particularly, this invention pertains to a storage container for taking up and storing excess amounts of cable.

BACKGROUND OF THE INVENTION

The telecommunications industry is rapidly proceeding with the development and installation of optical fiber transmission systems. In order that cable network systems are neatly arranged and manageable, the excess amounts must be stored in a neat and orderly manner for facilitating ease of use of the network apparatus. Such slack lengths of cable may include ribbon cables including fiber optic ribbon cables.

When managing and storing ribbon cables it is important to protect the cables from the deleterious effects of both bending a cable below its minimum bend radius, as well as twisting of the ribbon cable. Both cause attenuation and loss of signal strength. Twisting or bending the ribbon cable also may cause the cable to break resulting in a complete disruption of the signal. Furthermore, the most efficient use of storage space for ribbon cable is accomplished when the ribbon cable is wound without twisting. Bending below the minimum bend radius is also to be avoided with round optical fiber cables, including single fiber lengths of cable, and copper-based cables.

Devices for storing excess amounts of optical fiber cables are known in the art. An optical fiber network and other cable networks including copper based networks require numerous techniques for managing and connecting a large number of cables.

In the management of cables such as optical fibers, it is necessary from time to time to provide slack or excess amounts of cable lengths. For example, commonly assigned U.S. Pat. No. 5,013,121 to Anton et al. issued May 7, 1991 teaches a cable storing apparatus which includes a spool for holding excess lengths of cable. In addition, U.S. Pat. No. 4,792,203 to Nelson et al. issued Dec. 20, 1988 teaches an optical fiber distribution apparatus which includes a spool for holding excess fiber from a trunk cable. Similarly, U.S. Pat. No. 4,798,432 to Becker et al. dated Jan. 17, 1989 teaches a storage container for a section of an optical fiber.

Notwithstanding advances made in the art, there is a continuing need for improvement in cable storage apparatus. For instance, in U.S. Pat. No. 5,013,121, the amount of storage capacity is limited by the fact that the cable is wound around the outside of the radius-limiting configuration on top of the spool. Therefore, the device quickly reaches its capacity and must be increased in width in order to store longer cable lengths.

It is an object of the present invention to provide an improved storage container for cable telecommunication systems including fiber optic systems with enhanced performance and storage density while maintaining low manufacturing costs.

SUMMARY OF THE INVENTION

One aspect of the present invention includes a cable storage spool for storing a length of slack cable such as ribbon cable. The spool includes a first and second flange member coupled by a center post. The first flange member includes a loop channel for holding a loop end of a cable. The first flange member also includes a transition opening to allow lengths of cable to transition between a first side of the first flange member and a cable storage chamber on the second side of the first flange member. The cable storage chamber is exposed to allow the lengths of cable to be wound around the center post.

Another aspect of the present invention relates to a center post for a cable storage spool wherein the center post includes portions characterized by different radii of curvature.

Another aspect of the present invention relates to including retention grooves in the flange members of a cable storage spool to removably engage retention members of a cable spool holder.

Another aspect of the present invention relates to a cable spool assembly including a cable spool received on a spool holder wherein the spool holder includes a curved support arm configured to fit between first and second flange members of the cable spool.

Another aspect of the present invention relates to varying the size of the loop channel on the first flange member to aid in properly securing the loop end of the cable to the cable storage spool.

Yet another aspect of the present invention relates to a cable holder mount which pivotally receives cable spool holders so that the spools may be stored in staggered stacks.

Another aspect of the present invention relates to incorporating detent means on the spool holders and the holder mounts so that the holders may be flipped and held in two different positions.

BRIEF DESCRIPTION OF THE DRAWINGS

FIG. 3 is a side cross section of a staggered stack of cable storage spools and holders in a cable spool mount according to the present invention.

FIG. 4 is a detailed view of area B in FIG. 3.

FIG. 12 is perspective view of the second flange member shown in FIG. 7.

FIG. 13 is a top view of the second flange member shown in FIG. 12.

FIG. 14 is a side view of the second flange member shown in FIG. 12.

FIG. 15 is a bottom view of the second flange member shown in FIG. 12.

FIG. 16 is an end view of the second flange member of FIG. 12.

FIG. 17 is a perspective view of a spool holder according to the present invention.

FIG. 18 is a top view of the spool holder of FIG. 17.

FIG. 19 is a end view of the spool holder of FIG. 17.

FIG. 20 is a cross section of FIG. 19 along line C—C.

FIG. 21 is a bottom view of the spool holder of FIG. 17.

FIG. 22 is a side view of the spool holder of FIG. 17.

FIG. 23 is a perspective view of a spool holder mount according to the present invention.

FIG. 24 is a bottom view of the spool holder mount of FIG. 23.

FIG. 25 is a front view of the spool holder mount of FIG. 23.

FIG. 26 is a cross section of FIG. 25 along line D—D.

FIG. 27 is a side view of the spool holder mount of FIG. 23.

DETAILED DESCRIPTION

Figure 1:
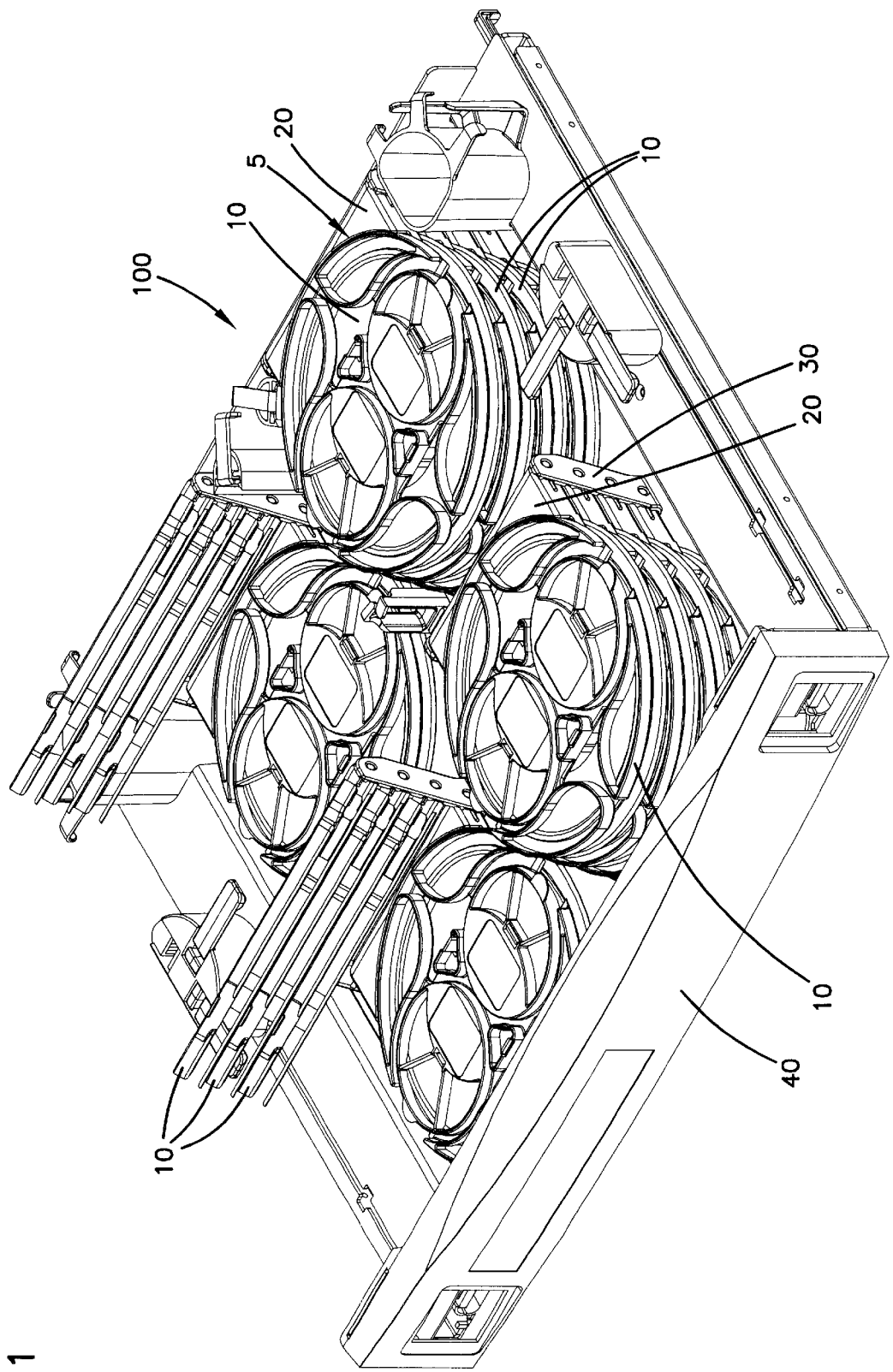
FIG. 1 is a perspective view of a cable management system incorporating cable storage spools, holders and holder mounts in a chassis according to the present invention.

Referring now to the several drawing figures in which identical elements are numbered identically throughout, a cable storage system 100 is shown in FIG. 1 constructed according to the present invention. The term cable as used herein includes ribbon cable as well as round cable (multi-stranded or single stranded) or any other telecommunications cable. Storage system 100 includes staggered stacks 5 of cable storage spools 10 held by spool holders 20 which are pivotally mounted to spool holder mounts 30. A plurality of holder mounts 30 each with its own staggered stack of cable storage spools 10 are coupled to a chassis 40 which may be a slidable drawer or tray as shown.

Figure 2:
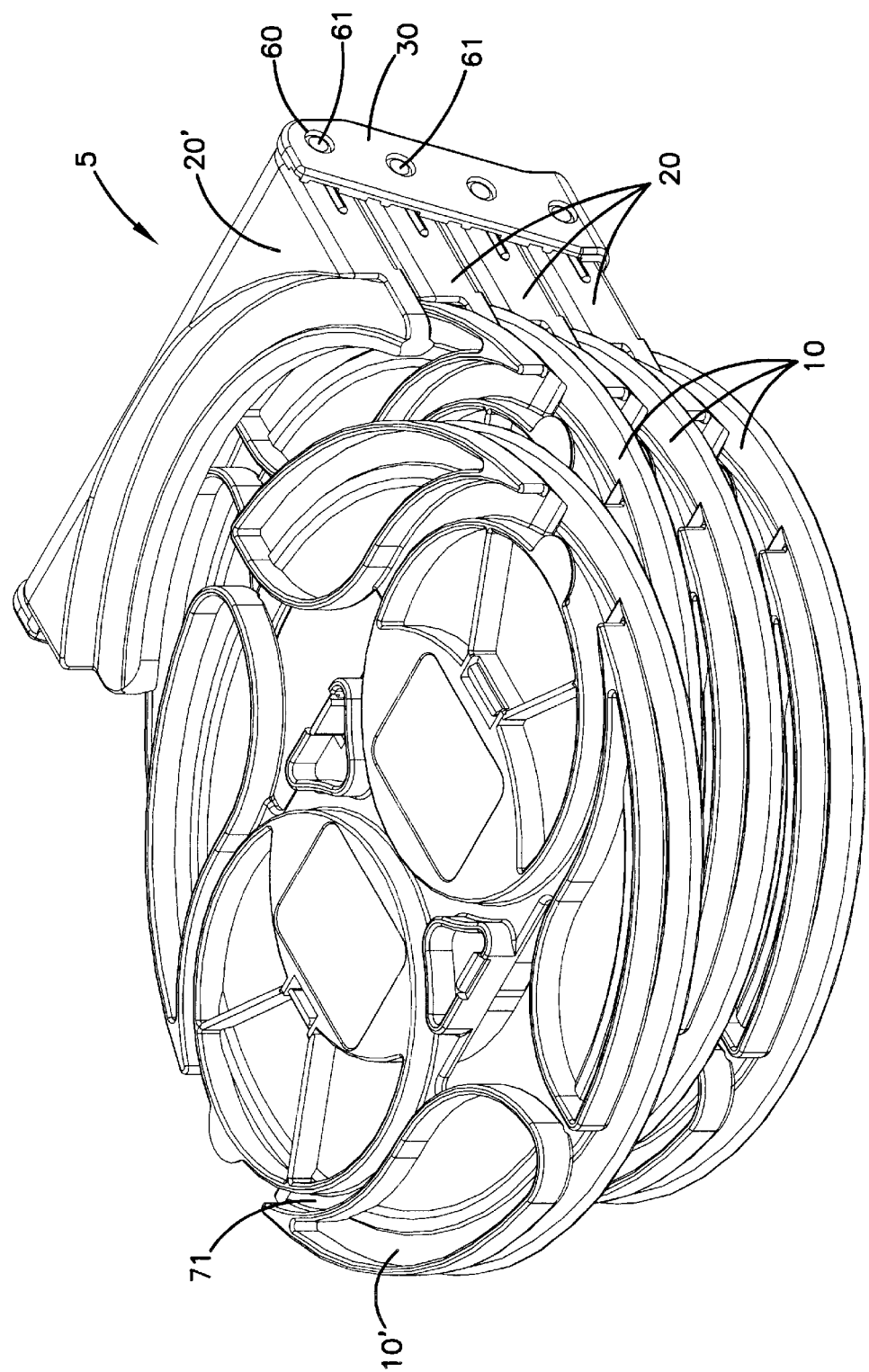
FIG. 2 is a perspective view of a staggered stack of cable storage spools and holders in a cable holder mount with one cable spool detached from its corresponding cable spool holder according to the present invention.

FIGS. 2–4 show a staggered stack 5 of four cable storage spools 10 and 10'. Each spool 10 is removably held by a spool holder 20. Spool 10' has been removed from holder 20'. The holders 20 are pivotally mounted into spool holder mount 30. The mount 30 defines pivot holes 60 which receive pivot posts 61 on the sides of each spool holder 20. Equivalently, the pivot posts could be formed on the mount 30 and the holes could be formed in the spool holders 20.

Figure 7:
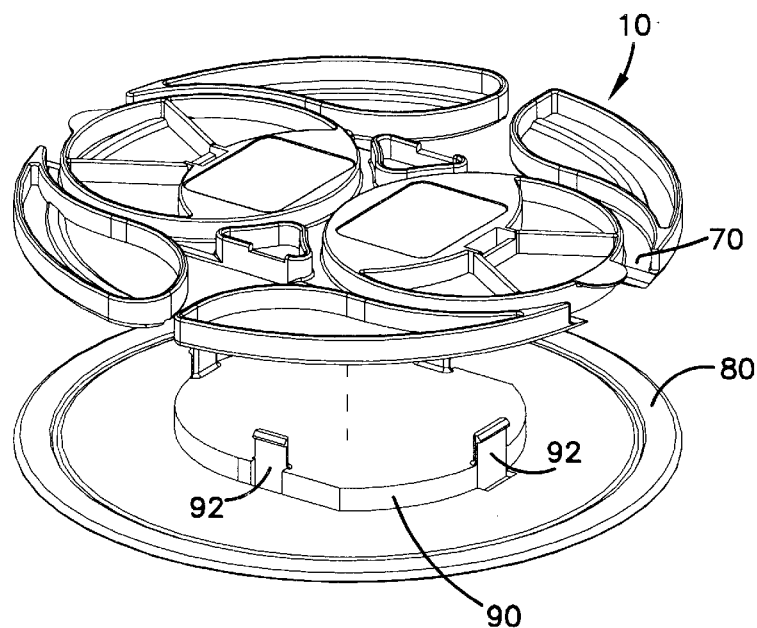
FIG. 7 is an exploded assembly view of the cable storage spool of FIG. 5.
Figure 5:
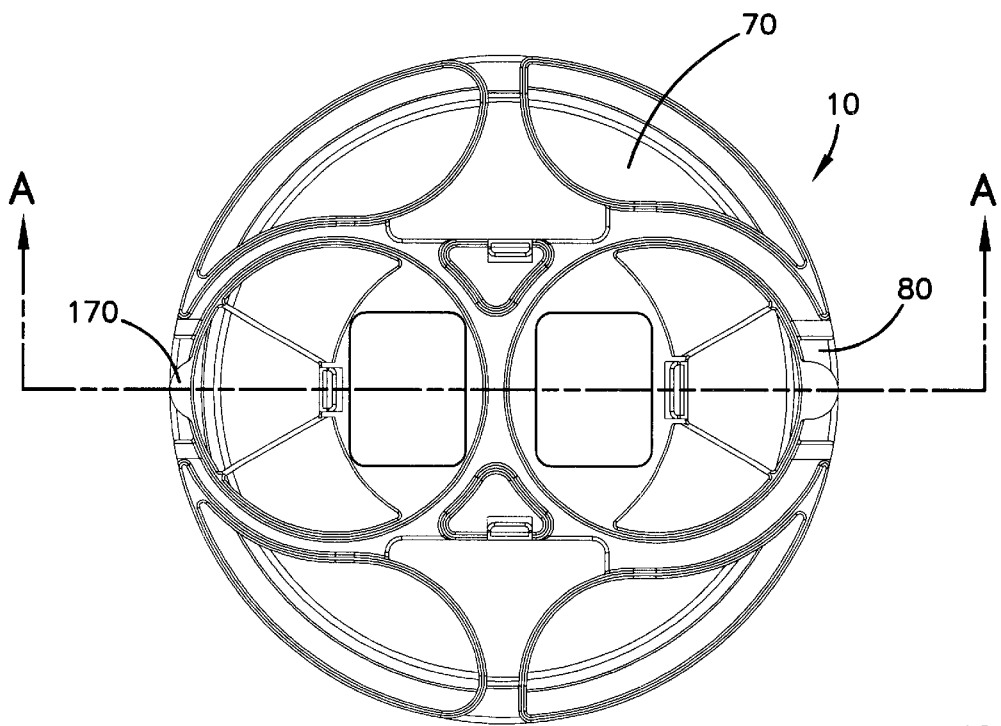
FIG. 5 is a top view of a cable storage spool according to the present invention.
Figure 6:
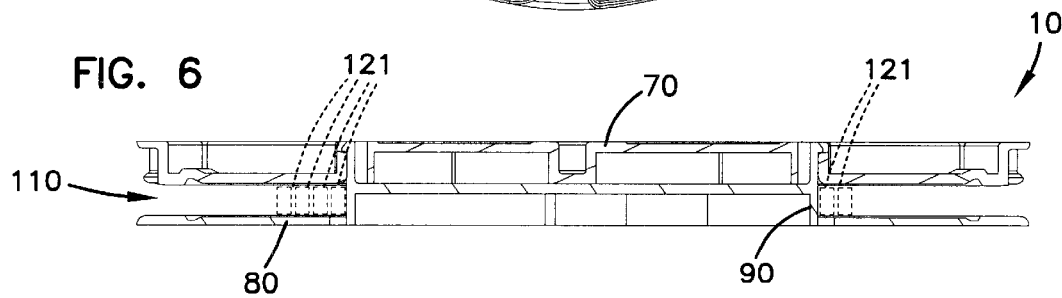
FIG. 6 is a cross section of FIG. 5 along line A—A.
Figure 8:
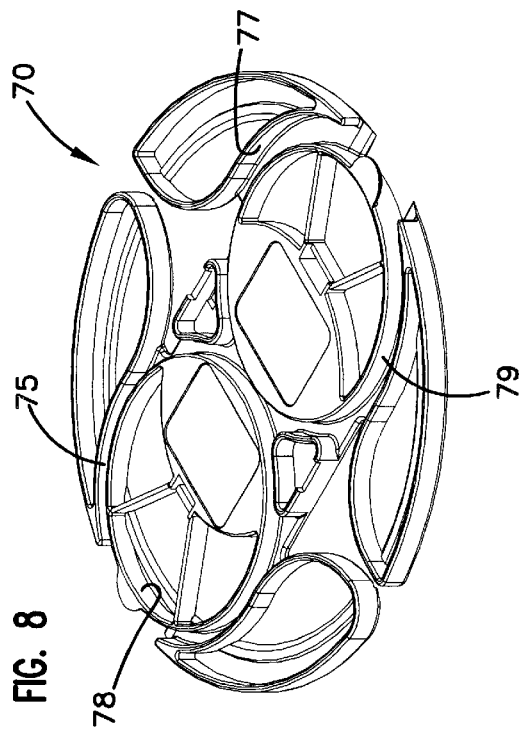
FIG. 8 is a perspective view of the first flange member of FIG. 7.
Figure 10:
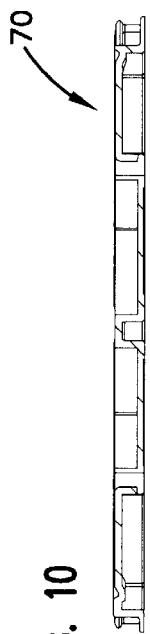
FIG. 10 is a cross section of FIG. 9 along line B—B.
Figure 9:
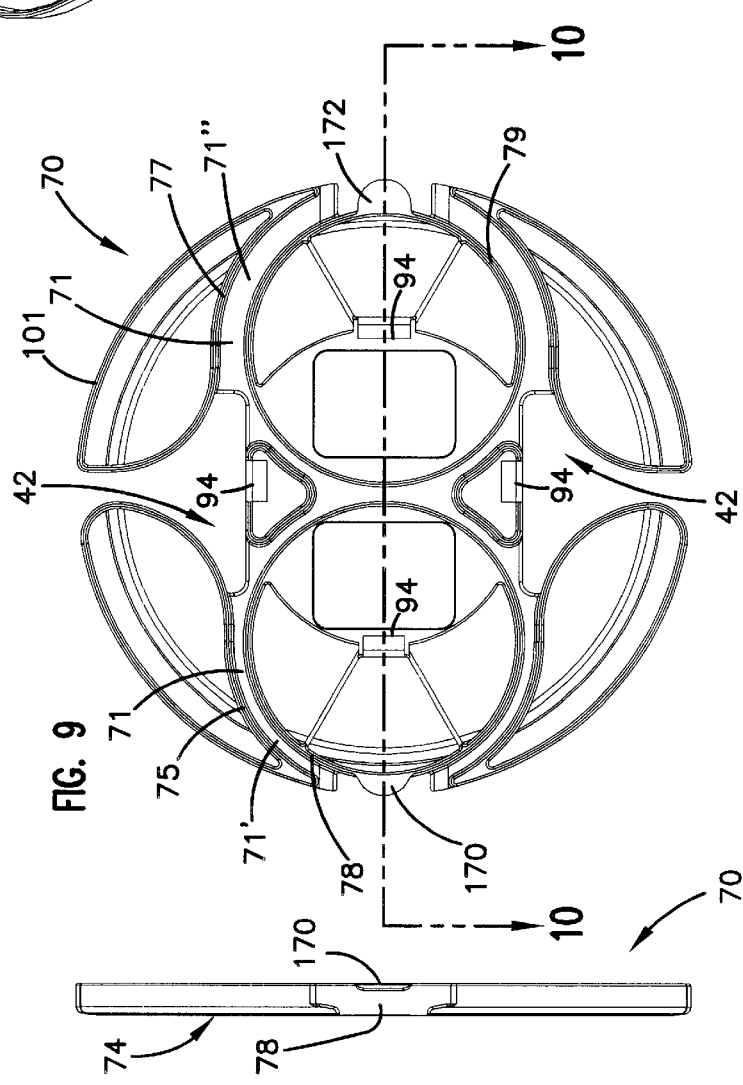
FIG. 9 is a top view of the first flange member of FIG. 8.
Figure 11:
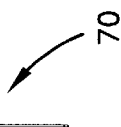
FIG. 11 is a side view of the first flange member of FIG. 9.

As best shown in FIGS. 5–7, especially FIG. 7, cable storage spool 10 includes first and second flange members 70 and 80. The first and second flange members 70 and 80 are coupled by a center post 90. The center post 90 extends from the second flange member 80. Center post 90 includes clips 92. Clips 92 are received in clip slots 94 in the first flange member 70. Alternatively, the center post 90 could extend from the first flange member 70 and be received via clip slots in the second flange member 80. The center post 90 and the first and second flange members 70 and 80 define a cable storage chamber 110.

As shown in FIGS. 8–11, the first flange member 70 has a first side 72 and a second side 74. The first side 72 of the first flange member 70 includes a loop channel 71 for holding a loop end of a cable in a fixed position relative to the first flange member 70. It is important that the loop channel 71 prevent the cable from bending beyond its minimum bend radius. The loop channel 71 is defined by two circular members 78 and 79 and curvilinear walls 75 and 77. Curvilinear wall 75 is preferably spaced from circular member 78 so that only one length of cable will fit into portion 71' of the loop channel 71. Curvilinear wall 77 is preferably spaced from circular member 79 so that two lengths of cable will fit into portion 71" of loop channel 71. Cable tabs 170 and 172 retain cables in the loop channel 71.

The second side 74 of the first flange member 70 defines a first retention groove 76. The first flange member 70 also defines transition openings 42 for allowing lengths of the loop of cable to pass from the first side 72 of the first flange member 70 to the second side 74 of the first flange member where it may wind around the center post 90 in the storage chamber 110. The center post 90 is exposed so that the lengths of cable may be wound by hand around the center post 90.

Significantly, the storage chamber 110 is located in a plane which lies beneath the plane occupied by the loop channel 71 in the orientation shown in the FIGS. That is, the lengths of cable to be stored are not wrapped around the elements which form the loop channel 71, but rather, the lengths of cable pass beneath the first flange member 70 by means of the transition opening 42 before being coiled around the center post 90. The cable storage spool 10 is thereby split into two levels, a radius protection level which holds the loop end of the cable and a storage level which stores coils of the cable wound around the center post 90. In this manner, the spool 10 permits more efficient use of storage space, for by dividing the radius protection level from the storage level, the width of the spool 10 may be made significantly smaller while only slightly increasing its thickness and maintaining the same storage capacity.

The second flange member 80 has a first side 82 and a second side 84. The first side of the second flange member 80 defines a second retention groove 86. The first and second flange members 70 and 80 both have an outermost edge 101 and 102 respectively. The outermost edges 101 and 102 are spaced apart to receive a spool holder 20 therebetween.

As shown in FIGS. 17–22, spool holders 20 include a support body 21 having a distal edge 22. As best shown in FIGS. 17 and 18, distal edge 22 of the support body 21 is curved to receive the round spools. Extending from the distal edge 22 is a support arm 23. Retention lips 26 and 27 extend from top and bottom sides 24 and 25 of the support arm 23. As shown in FIG. 4, support arm 23 is received between first flange member 70 and second flange member 80 so that retention lips 26 and 27 engage first and second retention grooves 76 and 86. In this way spools 10 may be removably held by the support arm 23 of the spool holders 20. Spool holders 20 may be offset as shown in the figures so that the holders are asymmetrical. This offset allows the stacks of spools to be stored more to one side of the spool holders 20 making more space available to access cables or other components in the system.

Referring now to FIGS. 12–16, center post 90 preferably is not a perfect circle. Instead, the center post 90 includes at least three different portions. A first portion 97 has a first radius of curvature. A second portion 98 has a second radius of curvature different from the first radius of curvature. A third portion 99 is straight and connects the first and second portions 97 and 98. The center post 90 is oriented relative to the first flange member 70 so that the straight, third portion of the center post 90 is beneath the transition opening 42. This orientation allows cable lengths to pass from the first side 72 to the second side 74 of the first flange member 70 and to wrap around the center post 90 without creating a disadvantageous bulge where the cables first begin to circle the center post 90. That is, the unique design of the center post 90 encourages the cable lengths to wrap more efficiently than would occur with a simple circular center post.

Referring now to FIGS. 23–27, cable holder mounts 30 can store cable spools 10 and holders 20 in staggered stacks. The holder mounts include a base 39, backing 38 and opposed mounting panels 31 and 32. Base 39 may include fastener posts 37 for securing the mount 30 to a chassis, fixture, or other holder. Mounting locations defined by the opposed panels 31 and 32 include pivot holes 60 for receiving pivot posts 61 of each spool holder 20. Panels 31 and 32 also define two detent slots 33 for each pivot hole 60. Detent slots 33 engage detent tabs 34 on sides 35 and 36 of spool holders 20 so that the spool holders may be flipped and held in at least two angled positions relative to the holder mount 30. The staggered stacks and the pivoting holders allow for easy access to each cable spool in the stack.

Figure 28:
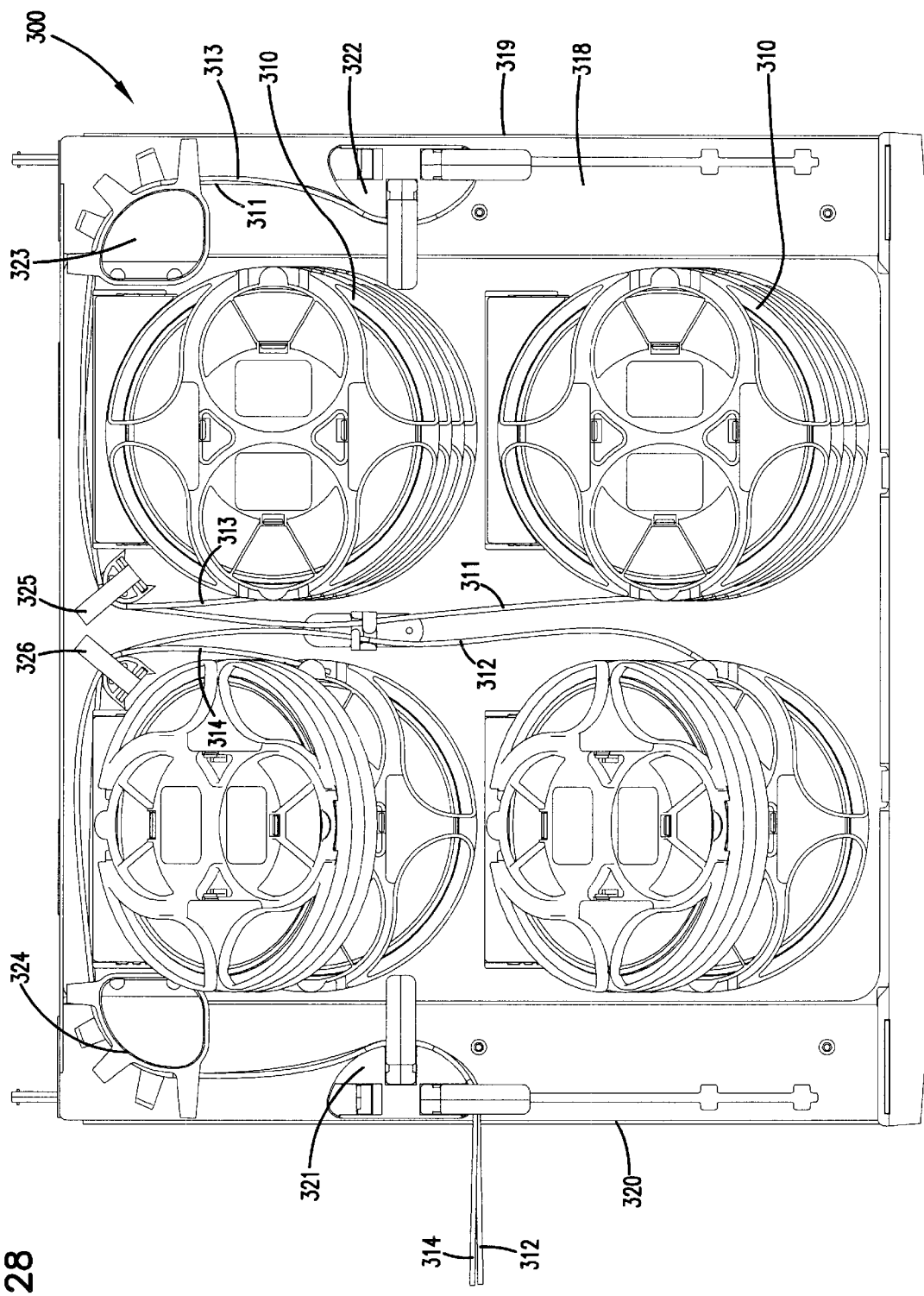
FIG. 28 is a top view of a cable management system with cables which incorporates the cable storage spools, holders, and mounts of the present invention.
Figure 29:
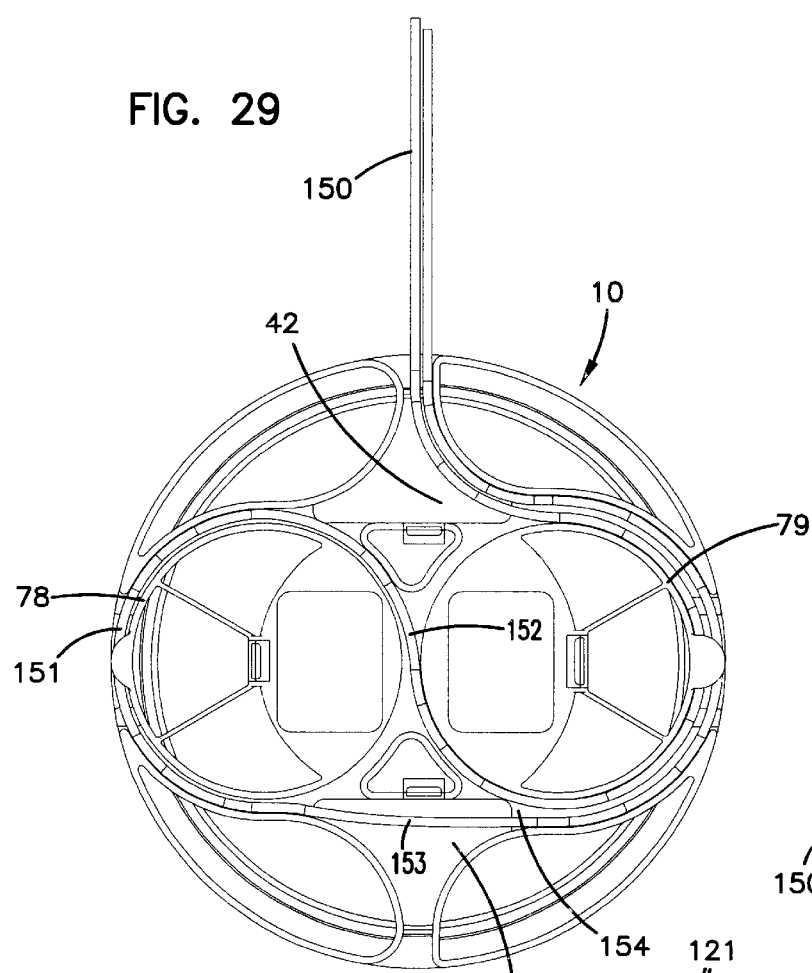
FIG. 29 is a top view of a cable storage spool with cable according to the present invention.
Figure 30:
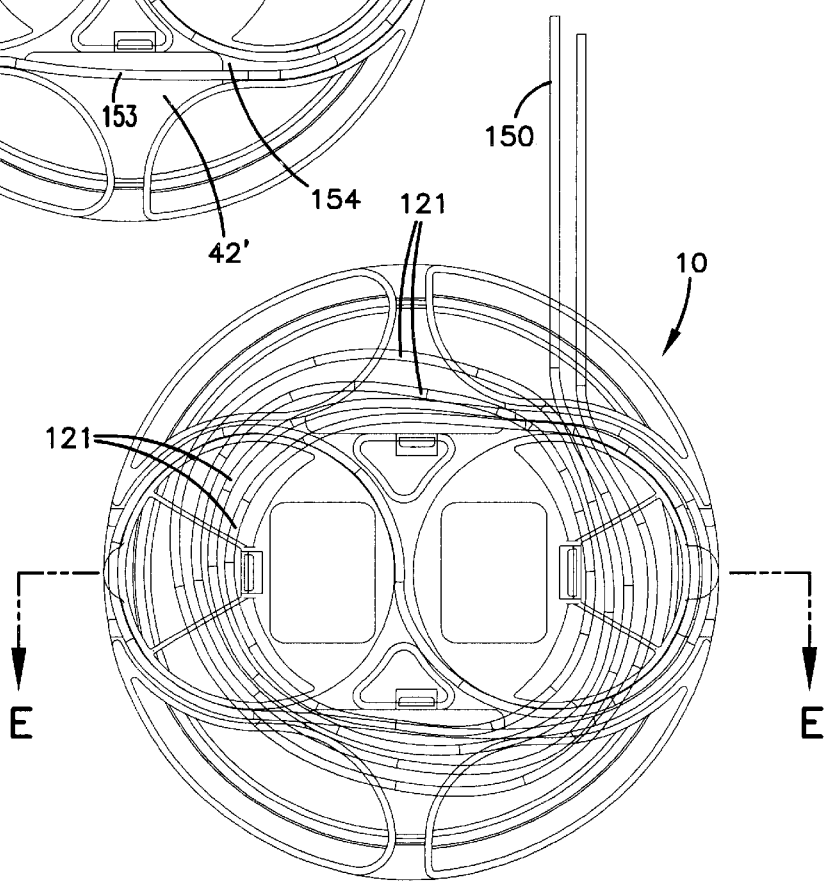
FIG. 30 is a top view of FIG. 29 with additional cable stored on the spool.

Referring now to FIG. 28, loop end 151 of cable 150 is placed in loop channel 71 proximate first circular member 78. Loop end 151 is generally the midpoint of the slack length to be stored. A first length of cable 152 is threaded between the first and second circular members 78 and 79. A second length of cable 153 is threaded along the loop channel 71 to meet the first length of cable 152 at point 154. Both lengths of cable then enter the widened portion 71" of loop channel 71 where they wrap around second circular member 79. Both lengths of cable are then threaded through the transition opening 42. FIG. 30 shows the same spool 10 and cable 150 as FIG. 29 with additional turns 121 of cable loosely wrapped around the center post 90 between the first flange member and the second flange member. When ribbon cable is stored on spool 10, the ribbon cables are laid out on loop channel 71 and wound around center post 90 with the major faces of the cable extending parallel to the longitudinal axis of spool 10. (See turns 121 in FIG. 6).

FIG. 28 shows cable management system 300 with a plurality of staggered stacks 310 of cable storage spools. The system shows cables 311–314 entering the chassis 318 from sides 319 and 320. Cables are then guided by cable guides 321–326 before they are collected and stored in respective cable storage spools. Although FIG. 28 shows only one length of cable entering each spool, it is to be understood that two lengths would be entering each spool according to the present invention for the spools store slack looped ends of cable.

Because the first flange member 70 and the center post 90 are symmetrical about the axis labeled E—E on FIG. 30, the cable lengths may be wound in both directions. The cables may be wound counterclockwise as shown in FIGS. 29 and 30, or the cables may be wound clockwise by threading cable length 153 between circular members 78 and 79 instead of cable length 152 and wrapping both cable lengths 152 and 153 clockwise around circular member 79 before threading them through transition opening 42'.

Since many embodiments of the invention can be made without departing from the spirit and scope of the invention, the invention resides in the claims hereinafter appended.

What is claimed is:

1. A cable spool assembly for storing an excess length of cable, the spool assembly comprising:
    a cable spool having:
        a first flange member having a first side and a second side, the first side of the first flange member defining a loop channel for holding a loop end of the cable in a fixed position relative to the first flange member, the first flange member defining at least one transition opening;
        a second flange member having a first side and a second side, at least one of the first and second flange members defining a first retention member;
        a center post coupling the second side of the first flange member to the first side of the second flange member;
        wherein the second side of the first flange member, the first side of the second flange member, and the center post define a cable storage chamber wherein a length of cable to be stored may pass from the loop channel of the first flange member through the transition opening of the first flange member to the storage chamber and may be wound around the center post; and
    a cable spool holder having:
        a support body having a distal edge and two side surfaces, the distal edge of the support body being curved;
        a support arm extending from the distal edge of the support body, the support arm being curved and having a first side and a second side, the support arm including a second retention member on the support arm;
    wherein the support arm of the cable spool holder is received in the cable storage chamber of the cable spool so that the first and second retention members of the cable spool and support arm, respectively, engage one another to selectively hold the cable spool to the cable spool holder.

2. The cable spool assembly of claim 1 wherein the center post of the cable spool includes a first portion, a second portion, and a third portion, the first portion of the center post having a first radius of curvature, the second portion of the center post having a second radius of curvature different than the first radius of curvature, the third portion of the center post being straight.

3. The cable spool assembly of claim 1 wherein the side surfaces of the cable spool holder each include one of a pivot post and a pivot hole for receiving a pivot post so that the cable spool holder may be pivotally mounted to a rack.

4. The cable spool assembly of claim 3, further comprising:
    a cable holder mount having a plurality of pairs of opposed, staggered mounting locations wherein a plurality of cable spool holders may be pivotally mounted to the cable holder mount to form a staggered stack of pivotable cable spool holders.

5. The cable spool assembly of claim 4, further comprising a chassis for holding the cable holder mount.

6. The cable spool assembly of claim 4 wherein the cable holder mount includes one of a detent tab and a detent notch to engage a respective detent tab or detent notch of the cable spool holder.

* * * * *